United States Patent Office 3,296,148
Patented Jan. 3, 1967

3,296,148
STABILIZATION OF ANHYDRIDES
Norbert E. Talbert, Morris Plains, and John J. Rizzo, Hopewell Township, Mercer County, N.J., assignors to FMC Corporation, New York, N.Y., a corporation of Delaware
No Drawing. Filed Nov. 15, 1965, Ser. No. 507,712
10 Claims. (Cl. 252—182)

This application is a continuation-in-part of our co-pending application Serial No. 240,155, filed November 26, 1962, now abandoned.

This application relates to the stabilization of organic acid anhydrides, and more particularly, to a method of stabilizing liquid polycarboxylic acid anhydrides with a small amount of a low molecular weight oxirane-containing compound.

It is well known that polycarboxylic acid anhydrides are useful as curing agents for various epoxy resins. However, since most polycarboxylic acid anhydrides are solid at room temperature, difficulties are encountered in trying to use these materials as epoxy resin curing agents. The general procedure for blending a solid anhydride with an epoxy resin is to heat the anhydride above its melting point and mix it with the resin at this temperature. However, when operating in this manner, the resin-anhydride mixture has a shortened "pot life" due to the elevated temperature used in preparing the mixture. Accordingly, it is advantageous to use a liquid anhydride whereby mixtures of the anhydride and epoxy resin can be prepared at room temperature without heating, thus extending the "pot life" of the mixture to be cured.

There has been much investigation in recent years of methods of making liquid polycarboxylic acid anhydrides. It has generally been found that various anhydrides can be blended together to form low melting mixtures or eutectics which may be liquid at room temperature. For example a mixture of 85 parts of hexahydrophthalic anhydride, M.P. 36° C., and 15 parts of tetrahydrophthalic anhydride, M.P. 101° C., forms a low melting eutectic which is liquid above 23–24° C. Such a mixture can "super-cool" readily and thus may remain liquid at temperatures below its true melting point. However, on standing the mixture deposits insoluble solids, even when stored under anhydrous conditions. These solids are presumed to be acids which precipitate slowly and which are very difficult to separate from the mixture.

Many methods of stabilizing these liquid anhydride blends have been suggested. For example, in U.S. Patent No. 2,890,204 it is suggested that these blends can be stabilized by adding large amounts of a glycidyl polyether resin. However, anhydrides stabilized in this manner are quite viscous and remain liquid for only 2–3 days at most. After this period of time the whole solution will turn cloudy or a precipitate will form at the bottom of the solution.

It is an object of this invention to provide a method of stabilizing the liquid state of polycarboxylic acid anhydrides for extended periods of time. Another object is to provide liquid polycarboxylic acid anhydride compositions which are stable in the liquid state at room temperature for extended periods of time. These and other objects will become apparent from the following description of this invention.

It has now been discovered that polycarboxylic acid anhydrides which form clear liquids at temperatures below about 100° C. and polycarboxylic acid anhydride mixtures which form clear liquids at temperatures below about 100° C. can be stabilized in the liquid state at room temperature for extended periods of time by heating the anhydride or anhydride mixture with about 0.1–2.0 milliequivalents per gram of anhydride of an oxirane-containing compound having a molecular weight not in excess of 200 at a temperature of about 90–140° C. until 0.1–1.0 milliequivalent of oxirane oxygen is reacted per gram of anhydride.

The stabilizing effect of low molecular weight oxirane-containing compounds on polycarboxylic acid anhydrides is quite surprisingly superior to that obtained when the glycidyl polyether resins of the prior art are employed. These low molecular weight compounds not only stabilize anhydrides and anhydride mixtures which are normally liquid at room temperature, but also those which are capable of forming a clear liquid when heated to a temperature below about 100° C. It is believed that the precipitate formed in unstable anhydrides or anhydride blends may in some cases be due to the formation of insoluble polycarboxylic acid formed by reaction of the anhydride with moisture present in the atmosphere. In other cases the instability may be due to the limited solubility of one of the components of the anhydride blend. In any event, if the liquid can be clarified by heating to a temperature below 100° C., then it is capable of being stabilized as a liquid at room temperature by the technique of this invention.

Although we do not want to be limited to any particular theory as to the manner in which the present invention operates, it is believed that a polyester is formed by reaction of the oxirane-containing compound with the anhydride which solubilizes the acid which would otherwise precipitate. The reaction may be initiated by the presence of acid in the anhydride mixture or hydroxyl groups present in the oxirane-containing compound. The insoluble acid formed by hydrolysis of the anhydride is undoubtedly incorporated in the polyester since the addition of preformed polyester to the anhydride does not result in stabilization.

In most cases stabilized anhydride mixtures tend to super-cool much more readily than the unstabilized anhydride mixture. When a typical anhydride mixture is stored at 0° C. for 16 hours, the unstabilized mixture will freeze. If sufficient oxirane-containing compound is reacted, for example 0.25–0.5 milliequivalent per gram, the resulting stabilized anhydride mixture will remain liquid at 0° C. for as long as one week. Even after repeated cooling to 0° C. and warming to room temperature, these mixtures remain stable.

Any polycarboxylic acid anhydride or mixture of polycarboxylic acid anhydrides which is capable of existing as a clear liquid at temperatures below about 100° C. may be stabilized in the liquid state at room temperature by the method of this invention. Any of the known dicarboxylic and tricarboxylic acid anhydrides are suitable; for example, phthalic, hexahydrophthalic, tetrahydrophthalic, maleic, succinic, glutaric, dodecenyl succinic, chlorendic, trimellitic, pyromellitic, and many others. Some of these anhydrides have melting points below 100° C. and thus, if sufficiently free of impurities, are capable of existing as clear liquids at temperatures below 100° C. Such anhydrides include hexahydrophthalic, maleic and glutaric. The other anhydrides mentioned above can be used in the formation of anhydride blends which come within the scope of the present invention. These blends will generally contain one or more of the anhydrides which melt below 100° C.

When two or more anhydrides are blended together to form a low melting blend, the composition of the blend which has the lowest melting point is the eutectic composition. When blends are being stabilized by the method of this invention, it is advantageous to use the eutectic blend to obtain maximum stability. Typical eutectics include a blend of 60 parts by weight hexahydrophthalic anhydride and 40 parts by weight of chlorendic anhydride, a blend of 74 parts by weight of hexahydrophthalic anhydride and 26 parts by weight of maleic anhydride, and a blend of 85 parts by weight of hexahydrophthalic anhydride and 15 parts by weight of tetrahydrophthalic anhydride.

Useful blends are obtained in the approximate range of the eutectic, for example blends containing 55–65 parts of hexahydrophthalic anhydride and 35–45 parts of chlorendic anhydride, blends containing 50–80 parts of hexahydrophthalic anhydride and 20–50 parts of maleic anhydride, blends containing 75–90 parts of hexahydrophthalic anhydride and 10–25 parts of tetrahydrophthalic anhydride, and blends containing 55–65 parts of hexahydrophthalic anhydride, 35–45 parts of chlorendic anhydride, and 25–35 parts of maleic anhydride. Particularly preferred is the blend containing 75–90 parts of hexahydrophthalic anhydride and 10–25 parts of tetrahydrophthalic anhydride, because of its low melting point and the excellent properties obtained when it is used to cure epoxy resins.

The oxirane-containing compounds which are useful in accordance with this invention are low molecular weight, monomeric compounds, that is non-resinous compounds having a molecular weight not in excess of about 200. These compounds may be oxirane-containing hydrocarbons, halogenated hydrocarbons, esters, ethers or any other oxirane-containing compound which does not contain functional groups which react with acids or anhydrides. Suitable oxirane-containing compounds, which will hereinafter be referred to as epoxides, include ethylene oxide, propylene oxide, epichlorohydrin, butadiene dioxide, octylene oxide, styrene oxide, limonene dioxide, dipentene dioxide, butyl glycidyl ether and phenyl glycidyl ether. When these epoxides are used to stabilize a liquid anhydride, the viscosity of the resulting mixture is less than about 300 centistokes at 25° C. Higher molecular weight epoxides such as glycidyl polyether resins are not as effective in stabilizing the anhydride and unduly increase the viscosity of the mixture.

The stabilization method of this invention is carried out by simply heating the anhydride and the epoxide at a temperature of 90–140° C. As the reaction progresses, the oxirane oxygen content of the mixture gradually decreases. The decrease can be determined by titration of the reaction mixture with hydrobromic acid. The rate of the reaction increases with increasing temperature. Preferably, temperatures of about 100–135° C. are employed, and most preferably 120° C. is used. If the composition is heated at a temperature above about 140° C., a darkening in color and an undue increase in viscosity will result. The reaction rate may be still further increased by the use of an amine catalyst. For example, 2-ethyl-4-methyl-imidazole (EMI) has been found to be helpful. Good results are obtained with only a small amount of amine such as 1% based on the weight of epoxide added.

The amount of epoxide added to confer liquid stability to the anhydride is generally about 0.1–2.0 and preferably 0.2–1.0 milliequivalent of oxirane oxygen per gram of anhydride. By "milliequivalent of oxirane oxygen" is meant the gram molecular weight of the epoxide divided by the number of oxirane oxygens contained in the molecule. If more than about 2.0 milliequivalents of oxirane oxygen per gram of anhydride are added, an undesirable increase in the viscosity of the anhydride composition may result. It is not necessary that all the epoxide added enter into the reaction. The reactants should be heated until about 0.1–1.0 and preferably 0.2–0.6 milliequivalent of oxirane oxygen are reacted per gram of anhydride. The residual epoxide enters into the reaction during cure of the epoxy resin.

After the heat treatment, care should be taken to avoid contamination of the liquid blend while it is cooling down to room temperature. It is especially important to protect the liquid blend from exposure to moisture or moist air. Preferably, the cooling of the liquid blend should take place in the presence of a dry atmosphere such as is provided by bubbling dry nitrogen gas through the liquid blend as it cools. Another alternative would be to transfer the liquid blend to a closed container while it is still at a temperature of about 100° C.

The stable liquid blends which result from the stabilization technique of this invention are particularly useful as curing agents for epoxy resins. The presence of the epoxide has no adverse effect upon the epoxy resin curing system in the amounts used in accordance with this invention. When a stabilized polycarboxylic acid anhydride of this invention is used as curing agent for an epoxidized polybutadiene or polyglycidyl ether resin the handling characteristics of the resin are actually improved.

The following examples, illustrating the method of stabilizing anhydrides and the resulting stable compositions disclosed herein, are presented without any intention that the invention be limited thereto. All parts and percentages are by weight.

*Example 1*

Tetrahydropthalic anhydride, 15 parts, was added to 85 parts of molten hexahydrophthalic anhydride. The mixture was heated at 75° C., until the tetrahydrophthalic anhydride dissolved. After cooling to room temperature, 2.3 parts (0.52 meq./gram), of ethylene oxide was added, and 0.023 part of EMI. The mixture was heated to 120° C. and kept at that temperature for 150 minutes whereby 0.41 meq./gram of oxirane oxygen reacted. The mixture was then cooled to room temperature while purging with nitrogen, and placed in a closed vessel where it remained liquid for more than four months.

*Example 2*

Propylene oxide, 2.75 parts (0.47 meq./gram), was added to a mixture of 85 parts of hexahydrophthalic anhydride and 15 parts of tetrahydrophthalic anhydride, and then 0.028 part of EMI was added. The resulting mixture was heated to 120° C. After 180 minutes, 0.16 meq./gram of the oxirane oxygen had reacted. After 300 minutes, 0.26 meq./gram had reacted. After cooling under nitrogen, the mixture remained liquid at room temperature for longer than one year.

A mixture of the same components was made but not heated. The mixture deposited solids after 48 hours.

A similar mixture was made but without the EMI. After heating for three hours at 120° C., only 0.08 meq./gram of oxirane oxygen had reacted. The mixture deposited solids after one week.

*Example 3*

A mixture of 85 parts of hexahydrophthalic anhydride and 15 parts of tetrahydrophthalic anhydride was heated at 75° C. until it became completely liquid. To this mixture was added 6 parts (0.50 meq./gram) of styrene oxide and 0.06 part of EMI. The temperature was raised to 120° C. and held at that temperature for 230 minutes, after which 0.44 meq./gram of oxirane oxygen had reacted. After cooling to room temperature under nitrogen, the mixture remained liquid for more than four months in a sealed container.

*Example 4*

(a) Limonene dioxide, 5 parts (0.52 meq./gram), was heated with 85 parts of hexahydrophthalic anhydride and 15 parts of tetrahydrophthalic anhydride. After 120 minutes at 120° C., 0.24 meq./gram of oxirane oxygen had reacted.

(b) When the example was repeated except that 0.05 part of EMI was added prior to heating, 0.35 meq./gram of oxirane oxygen reacted after 120 minutes. Both mixtures were liquid indefinitely at room temperature in a sealed container.

Example 5

A mixture of 85 parts of hexahydrophthalic anhydride and 15 parts of tetrahydrophthalic anhydride was melted, 4.6 parts (0.50 meq./gram) of epichlorohydrin was added, and the mixture was heated to 120° C. After 390 minutes at 120° C., 0.38 meq./gram of epoxide had reacted and the mixture was cooled to room temperature. In a sealed container the mixture remained liquid at room temperature for more than three months.

In order to establish the utility of stabilized anhydride mixtures described, the mixtures were used to cure a commercial glycidyl polyether resin known as Epon-828. One hundred parts of the epoxy resin were mixed with 90 parts of the stabilized anhydrides and 0.38 part of EMI catalyst. The mixture was cured by heating for two hours at 90° C., and four hours at 130–150° C. A sample of unstabilized anhydride composition was also used to cure the epoxy resin as a control. The following data were obtained:

| Example | Epoxide | Meq. of Epoxide Charged per Gram of Anhydride | Meq. of Epoxide Reacted per Gram of Anhydride | Viscosity cs. at 25° C. | Cured Properties | |
|---|---|---|---|---|---|---|
| | | | | | Heat Distortion Temp., 10 mils, ° C. | Rockwell Hardness, M |
| 1 | Ethylene oxide | 0.52 | 0.41 | 150 | 125 | 105 |
| 2 | Propylene oxide | 0.47 | 0.26 | 154 | 127 | 106 |
| 3 | Styrene oxide | 0.50 | 0.44 | 80 | 126 | 103 |
| 4a | Limonene dioxide | 0.52 | 0.24 | 80 | 128 | 108 |
| 4b | do | 0.52 | 0.35 | 94 | 128 | 108 |
| 5 | Epichlorohydrin | 0.50 | 0.38 | 235 | 119 | 94 |
| Control | None | | | 65 | 126 | 109 |

Example 6

Butadiene dioxide, 2.3 parts (0.53 meq./gram), and 0.023 part of EMI was added to a mixture of 85 parts of hexahydrophthalic anhydride and 15 parts of tetrahydrophthalic anhydride. After heating at 120° C. for 300 minutes, 0.51 meq./gram of oxirane oxygen had reacted. The resultant cooled mixture was liquid at room temperature for more than three months.

Example 7

A mixture of 60 parts of hexahydrophthalic anhydride and 40 parts of chlorendic anhydride was heated at 85° C. until it was completely liquid. To this liquid mixture was added 10 parts of limonene dioxide and the temperature was slowly raised to 100° C. An exotherm raised the temperature to 110° C. and the temperature was maintained at that temperature for 30 minutes, after which it was allowed to cool to room temperature while purging with dry nitrogen. The mixture was placed in a closed vessel where is remained liquid for more than 3 months.

The above example was repeated except that the limonene dioxide was omitted. The resulting mixture was placed in a tightly closed vessel. After 7 hours the mixture had formed a thick skin on its surface and had begun to precipitate an insoluble component.

In order to establish the utility of the stabilized anhydride compositions of this invention, 80 parts of the above stabilized anhydride containing limonene dioxide was mixed with 100 parts of an epoxidized polybutadiene resin containing 9.0% oxirane oxygen and having a viscosity of 2,000 poises. Test specimens were cast and cured by heating for 2 hours at 80° C. and 4 hours at 155° C. The resulting product had a flexural strength of 10,000, a flexural modulus of $.44 \times 10^6$, an elongation of 2.4%, a Rockwell M hardness of 90, a tensile strength of 4,000, and a tensile modulus of $4.3 \times 10^6$.

Example 8

A mixture of 100 parts of hexahydrophthalic anhydride and 10 parts of tetrahydrophthalic anhydride were melted at 80° C. To the mixture was added 7.5 parts of dodecenyl succinic anhydride. To this blend was added 5 parts of a crude mixture of terpene dioxides containing dipentene dioxide (Terpox) and the temperature was slowly raised. The exotherm temperature rose to 100° C. and was maintained there for 30 minutes after which the mixture was allowed to cool while purging with dry helium. The mixture was placed in a closed vessel and remained as a stable liquid for more than 3 months.

Example 9

Three blends were prepared by mixing 100 parts of hexahydrophthalic anhydride with 5, 10 and 15 parts of limonene dioxide at 60° C. Each of these blends was heated to 100° C. at which temperature an exotherm was observed. After remaining at this temperature for 15 minutes, the compositions were allowed to cool to room temperature while purging with dry nitrogen. The resulting mixture was placed in a closed vessel where it remained liquid for more than 3 months.

This example was repeated for the three blends by heating the anhydride with limonene dioxide until a clear solution was produced at 50° C., but no further heat treatment was given. Each of the blends formed a crystalline precipitate after 90 hours.

Example 10

A blend was prepared by melting 50 parts of hexahydrophthalic anhydride and 50 parts of maleic anhydride. To this blend was added 10 parts of limonene dioxide and the temperature was allowed to rise exothermically to 120° C. and maintained at that temperature for 30 minutes. The mixture was allowed to cool to room temperature while purging with dry nitrogen. After this treatment the composition remained as a stable liquid for more than 3 months.

Example 11

A blend of 60 parts of hexahydrophthalic anhydride and 40 parts of chlorendic anhydride was melted at 85° C. and 100 parts of maleic anhydride was added at 70° C. To this blend was added 10 parts of limonene dioxide and the mixture was heated until the temperature rose exothermically to 135° C. After maintaining this temperature for 30 minutes, the blend was allowed to cool to room temperature while purging with dry nitrogen. It remained liquid at this temperature for more than 3 months.

The above example was repeated, except that only 30 parts of maleic anhydride was blended with the other anhydrides at 75° C. The exothermic temperature rose to 100° C. Again, the final product was a stable liquid for more than 3 months.

Example 12

A blend of 60 parts of hexahydrophthalic anhydride and 40 parts of chlorendic anhydride was liquified at 85° C. and 10 parts of pyromellitic anhydride were melted in at 175° C. The blend remained liquid as it was allowed to cool until a temperature of 98° C. was reached at which temperature a precipitate formed. To this blend was added 10 parts of limonene dioxide and the mixture was heated to 100° C. at which temperature there was an exothermic rise to 133° C. The temperature was maintained at 133° C. for 30 minutes and then allowed to cool to room temperature while purging with dry nitrogen.

The resulting composition remained liquid for more than 3 months.

The above example was repeated except that 10 parts of trimellitic anhydride were substituted for the pyromellitic anhydride. Again the resulting composition remained liquid for more than 3 months.

*Example 13*

A blend was prepared by melting 80 parts of hexahydrophthalic anhydride with 20 parts of tetrahydrophthalic anhydride. To this blend was added 10 parts of limonene dioxide and the temperature was raised to 100° C. and maintained at that level for 30 minutes. After cooling and purging with dry nitrogen, the resulting composition remained liquid for more than 3 months.

As will be apparent to those skilled in the art, numerous modifications and variations of the anhydride blend and the epoxide stabilizer may be made without departing from the spirit of the invention or the scope of the following claims.

What is claimed is:

1. A method of stabilizing the liquid state of a polycarboxylic acid anhydride selected from the group consisting of polycarboxylic acid anhydrides which form clear liquids at temperatures below 100° C. and polycarboxylic acid anhydride mixtures which form clear liquids at temperatures below 100° C. which comprises heating the anhydride with 0.1-2.0 milliequivalents per gram of anhydride of an oxirane-containing compound having a molecular weight not in excess of 200 and free of functional groups which react with the said anhydride, at a temperature of 90-140° C. until 0.1-1.0 milliequivalent of oxirane oxygen is reacted per gram of anhydride, thereby stabilizing the polycarboxylic acid anhydride in the liquid state for at least three months.

2. The method of claim 1 in which the oxirane-containing compound is selected from the group consisting of ethylene oxide, propylene oxide, epichlorohydrin, butadiene dioxide, styrene oxide, limonene dioxide or dipentene dioxide and the temperature is 100-135° C.

3. The method of claim 2 in which the anhydride is heated with 5-15 parts by weight of limonene dioxide per 100 parts of anhydride.

4. The method of claim 2 in which 0.2-0.6 milliequivalent of propylene oxide is reacted per gram of anhydride.

5. The method of claim 2 in which the anhydride is a mixture of 75-90 parts of hexahydrophthalic anhydride and 10-25 parts of tetrahydrophthalic anhydride.

6. A liquid polycarboxylic acid anhydride composition which is stable in the liquid state for at least three months which comprises the reaction product formed by heating a polycarboxylic acid anhydride selected from the group consisting of polycarboxylic acid anhydrides which form clear liquids at temperatures below 100° C. and polycarboxylic acid anhydride mixtures which form clear liquids at temperatures below 100° C. and 0.1-2.0 milliequivalents per gram of anhydride of an oxirane-containing compound having a molecular weight not in excess of 200 and free of functional groups which react with the said anhydride, at a temperature of 90-140° C. until 0.1-1.0 milliequivalent of oxirane oxygen is reacted per gram of anhydride.

7. The stable liquid polycarboxylic acid anhydride composition of claim 6 in which the oxirane-containing compound is selected from the group consisting of ethylene oxide, propylene oxide, epichlorohydrin, butadiene dioxide, styrene oxide, limonene dioxide or dipentene dioxide and the temperature is 100-135° C.

8. The stable liquid polycarboxylic acid anhydride composition of claim 7 in which 0.2-0.6 milliequivalent of propylene oxide is reacted per gram of anhydride.

9. The stabilized liquid polycarboxylic acid anhydride of claim 7 in which the anhydride is a mixture of 75-90 parts of hexahydrophthalic anhydride and 10-25 parts of tetrahydrophthalic anhydride.

10. A liquid polycarboxylic acid anhydride composition which is stable in the liquid state for at least three months which comprises the reaction product formed by heating a polycarboxylic acid anhydride selected from the group consisting of polycarboxylic acid anhydrides which form clear liquids at temperatures below 100° C. and polycarboxylic acid anhydride mixtures which form clear liquids at temperatures below 100° C. and 5-15 parts by weight of limonene dioxide per 100 parts of anhydride until 0.1-1.0 milliequivalent of oxirane oxygen is reacted per gram of anhydride.

References Cited by the Examiner

UNITED STATES PATENTS

| | | | |
|---|---|---|---|
| 2,966,479 | 12/1960 | Fischer | 260—78.4 |
| 2,977,374 | 3/1961 | Phillips et al. | 260—348 |
| 3,073,792 | 1/1963 | Greenspan | 260—348 |
| 3,078,235 | 2/1963 | Bowman et al. | 252—182 |
| 3,098,059 | 7/1963 | Van Strien et al. | 260—78.4 |
| 3,102,872 | 9/1963 | Carlson et al. | 260—368 |
| 3,213,067 | 10/1965 | Pohl et al. | 260—78.4 |

SAMUEL H. BLECH, *Primary Examiner.*

ALBERT T. MEYERS, *Examiner.*

M. WEINBLATT, *Assistant Examiner.*